United States Patent
Hildebrand

(10) Patent No.: US 8,630,948 B1
(45) Date of Patent: Jan. 14, 2014

(54) SYSTEMS AND METHODS FOR ROUTING BILL PAYMENTS

(75) Inventor: Marc W. Hildebrand, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 335 days.

(21) Appl. No.: 12/397,585

(22) Filed: Mar. 4, 2009

(51) Int. Cl.
*G06Q 40/00* (2012.01)

(52) U.S. Cl.
USPC .............................. 705/40; 705/35

(58) Field of Classification Search
USPC ........................ 705/35, 38, 39, 40
See application file for complete search history.

(56) References Cited

U.S. PATENT DOCUMENTS

| | | |
|---|---|---|
| 2004/0215560 A1* | 10/2004 | Amalraj et al. ............... 705/40 |
| 2004/0230526 A1 | 11/2004 | Praisner |
| 2005/0234820 A1 | 10/2005 | MacKouse |
| 2006/0149671 A1 | 7/2006 | Nix et al. |
| 2007/0005496 A1 | 1/2007 | Cataline et al. |
| 2007/0162387 A1 | 7/2007 | Cataline et al. |

* cited by examiner

*Primary Examiner* — Ojo O Oyebisi
(74) *Attorney, Agent, or Firm* — Brooks, Cameron & Huebsch, PLLC

(57) ABSTRACT

Electronic payments are typically initiated on a bank's web site, and then routed to a third-party processor for payment. There may be different processors having different pricing structures. Routing software may be provided that routes payments to the various processors (or causes payments to be processed without a third-party processor) based on considerations of cost-effectiveness. For example, the routing software may choose the payment processor that has the lowest price for a certain type of payment, or may route a certain number of payments to a processor in order to fulfill volume pricing minimums, or may aggregate payments for several days in order to handle the payments in one transaction and reduce transaction fees.

19 Claims, 4 Drawing Sheets

SYSTEMS AND METHODS FOR ROUTING BILL PAYMENTS

BACKGROUND

Electronic bill payment has replaced many paper bill payments. While it used to be common practice for people to pay a bill by writing a paper check and mailing the check to the payee, it is now common for people to pay bills through on-line banking systems. Typically, a person visits the web site of his or her bank, or that of the payee, and initiates a payment. The payment is then scheduled for a certain date, at which time the amount of the payment is deducted from the person's bank account (or other source of funds), and credited to the payee's account. This process represents an efficiency for both payers and payees. The payer typically saves time relative to writing and mailing a paper check, and also saves the cost of postage. The payee typically saves the cost of processing paper payments, since receipt of electronic payments is a process that is largely automatable.

Electronic payments are typically processed through third-party processors. Thus, when a person initiates an electronic payment through his or her bank's web site, the bank often does not process the payment directly, but instead arranges for a payment processor to process the payment. The bank or other financial institution typically pays fees to the payment processor for handling payments. (The fees may be on a per-payment basis, or there may be another arrangement.)

SUMMARY

A bank or other financial institution may maintain relationships with various processors, each of which has a particular pricing structure. The bank may route payments to the different processors based on how to leverage the various processors' pricing structures cost effectively. For example, one processor may have the lowest cost to process payments to payee A, and another processor may have the lowest cost to process payments to payee B. The bank may employ payment routing software that considers these different costs, and routes payments to the different processors in a cost-effective way.

Cost-effectiveness may involve routing a given payment to the lowest-priced processor for that particular payment. However, cost-effectiveness may involve other considerations. For example, some processors may have volume pricing as part of their payment structures, in which case it may be more cost-effective to route a payment to the processor that has a higher price for that particular payment, if doing so allows the routing bank to meet a goal for a number of payments through that particular processor, thereby satisfying volume pricing conditions and obtaining lower overall costs. As another example, there may be cost savings to be achieved by holding a group of payments to a particular payee for some date in the future and making all of the held payments at the same time, rather than making payments each day. If the due date of the payment indicates that it can be held for a future date, then routing software may aggregate payments to a particular payee for several days, and then make a payment en masse. As yet another example, the bank through which payments are initiated might save costs by routing certain types of payments itself, rather than through a payment processor. For example, payments made to the bank itself could be made without the use of a third-party payment processor. Or, payments made to institutions with which the bank already has a payment arrangement in place could be made without a third-party processor. These are some examples, although various scenarios are possible.

This summary section is provided to introduce a selection of concepts in a simplified form that are further described below in the detailed description section. This summary section is not intended to identify key features or essential features of the claimed subject matter, nor is it intended to be used to limit the scope of the claimed subject matter.

DETAILED DESCRIPTION

Figure 1:
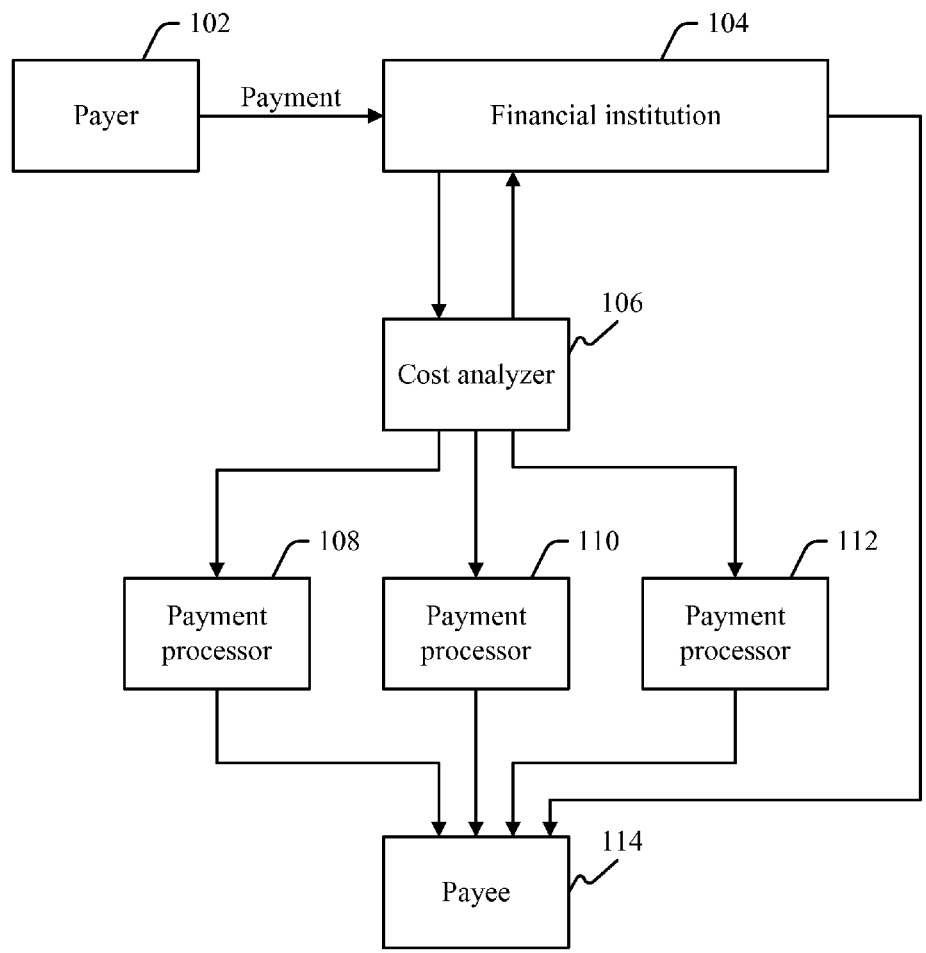
FIG. 1 is a block diagram of an example scenario in which a payment may be initiated through a financial institution and processed.

Electronic payments are continuing to replace paper payments. In the past, people typically paid their bills by writing and mailing paper checks, many customers now choose to pay their bills on their bank's web site, through an electronic payment process.

Typically, a customer's bank (or credit union, or brokerage house, or other type of financial institution) acts as a portal though which payments may be initiated. That is, the customer typically visit's the bank's web site, navigates to a bill payment page, and then initiates payment to a payee. Initiating payment normally involves naming the payee (where recurring payees may be stored so the customer does not have to re-enter them), and providing the amount to be paid and the date by which payment is to be made. While it appears to the customer that the bank is processing the payment, the bank often arranges to have the payment processed through a third-party processor, such as CheckFree. The third-party processor typically maintains the infrastructure and arrangement that allow electronic payments to occur. Electronic payments involve the transfer of money from a bank to the payee, and also involve identifying the account to which each payment is being made so that the payer may receive credit for the payment. These actions are typically managed by software, which the third-party processor maintains and uses on behalf of the bank through which the payment was initiated.

Payment processors charge the banks fees for their services they provide to the banks. Different payment processors typically charge different fees, and the fees may vary by payee. For example, processor A might handle millions of payments per day to a particular credit card issuer, and thus might be able to offer very low pricing to process payments to that issuer. Processor A might charge a higher price to process payments to a small insurance company, but processor B might be able to offer a lower price to process payments to that same insurance company. Some payees are not set up to receive electronic payments, and processing payments to those payees is expensive because doing so involves printing and mailing paper checks. However, processors A and B might charge different prices for generating and mailing these paper checks. For any given payment processor A or B (or some other processor) might have the lower price. When the bank accepts its customer's request for an electronic payment, the bank is obliged have the payment processed, but the customer is normally indifferent as to the exact mechanism that is used to process the payment. Thus, the bank may wish to find a cost-effective way to discharge its obligation to its customer.

The subject matter described herein provides ways for a bank (or other financial institution) to route payments cost-effectively. The bank may use payment routing software that chooses a cost-effective strategy to route the payment. The routing software may choose the processor with the lowest cost for a given payment. Or, the routing software could direct payments to a certain processor in order to meet certain volume pricing minimums. The routing software could hold non-urgent payments to a particular payee for some number of days, so that those payments could be sent to a processor en masse (thereby, possible, taking advantage of lower transaction fees by grouping a larger number of payments together). Or, the routing software might determine that it is more cost-effective for the bank to process some payments itself without the use of a payment processor. Various scenarios are possible.

Turning now to the drawings, FIG. 1 shows an example scenario in which a payment may be initiated through a financial institution, and then processed. In the example shown, payer 102 may initiate a payment with financial institution 104. Financial institution 104 may be a bank, a credit union, a brokerage house, etc. Financial institution 104 may operate a web site that allows payer 102 to initiate a payment to a payee. For example, payer 102 may use a bill-payment feature of the bank's web site to initiate a payment to payer 102's credit card issuer. At the time the payment is initiated, payer 102 may specify an amount of the payment, and a date on which the payment is to be made.

Financial institution 104 may use cost analyzer 106 to analyze the cost of making the requested payment. Typically, financial institution 104 is contractually bound to execute the payment initiated by its customer, but financial institution 104 may attempt to find a cost-effective way to discharge its obligation to complete the payment. Cost analyzer 106 may, for example, take the form of a computer program.

Financial institution 104 may call on various payment processors to process the payment initiated by payer 102. The example of FIG. 1 shows three payment processors 108, 110, and 112, although there could be any number of payment processors. Payment processors 108-112 may have different cost structures associated with payments. These cost structures could take any form. For example, payment processors 108-112 may charge a specific price for processing each payment, or may have some form of volume pricing whereby the price per payment goes down after a certain number of payments have been processed, or may use any other type of pricing structure. Cost analyzer 106 determines how to transmit the payment requested by payer 102 to payee 114 in a cost-effective manner.

Cost analyzer 106 might choose to transmit the payment to payee 114 using one of payment processors 108-112 (as indicated by the arrows leading from cost analyzer 106 to payment processors 108-112, and from payment processors 108-112 to payee 114). Among payment processors 108-112, cost analyzer 106 might choose one based on various considerations. Cost analyzer 106 might choose the payment processor that offers the lowest price for a particular payment. However, cost analyzer 106 might choose a payment processor that offers a higher price if there are other reasons to do so. For example, a particular payment processor might have a higher price to process the payment in question, but might offer volume pricing discounts, so cost analyzer 106 might determine that it is worth it to pay a higher fee now in order to get the volume pricing discounts that will accrue. In general, cost analyzer 106 may take arbitrarily-complex cost considerations into account when making its decision about how to process a payment.

Or, as another example, cost analyzer 106 might choose to use none of payment processors 108-112, and instead have financial institution 104 transmit the payment to payee 114 directly (as indicated by the arrow leading from cost analyzer 106 to financial institution 104, and the arrow from financial institution 104 to payee 114). For example, cost analyzer 106 might determine that none of payment processors 108-112 can process a particular payment as cost-effectively as financial institution 104 could.

Figure 2:
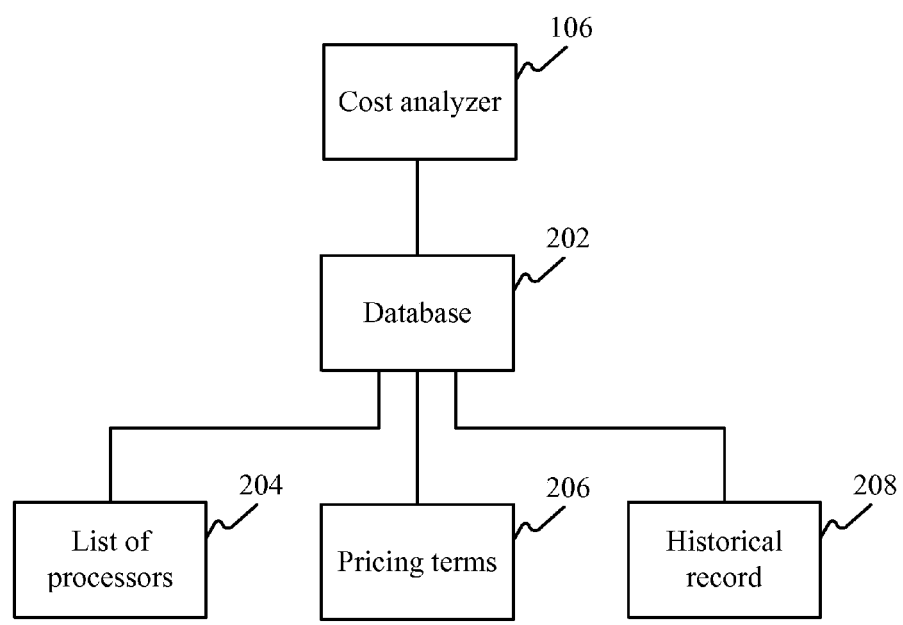
FIG. 2 is a block diagram of a cost analyzer, and of information that the cost analyzer may use in making a decision about how to route a payment for processing.

FIG. 2 shows examples of information that cost analyzer 106 may use in making a decision about how to route a payment for processing. Cost analyzer 106 may comprise, or communicate with, database 202. Database 202 may contain a list 204 of payment processors, pricing terms 206 on which those processors are willing to process payments, and a historical record 208 of payments that have already been processed. Cost analyzer 106 may use this information in various ways.

For example, cost analyzer 106 may use the list of processors and pricing terms to determine which processor can provide the lowest cost to process a particular payment. As another example, historical record 208 may indicate how many payments have been sent to the various processors. As previously noted, processors may offer lower prices if certain volume minimums are met. In such a case, cost analyzer may look at the pricing terms to determine at what volume the lower prices are available, and may look at historical record to determine how close a particular financial institution is to meeting that volume level. Cost analyzer may then make a decision based historical record 208 and pricing terms 206. The foregoing illustrate some considerations that cost analyzer 106 may take into account in finding a cost-effective option for routing a payment, but cost analyzer 106 could look for cost effective options in other ways.

Figure 3:
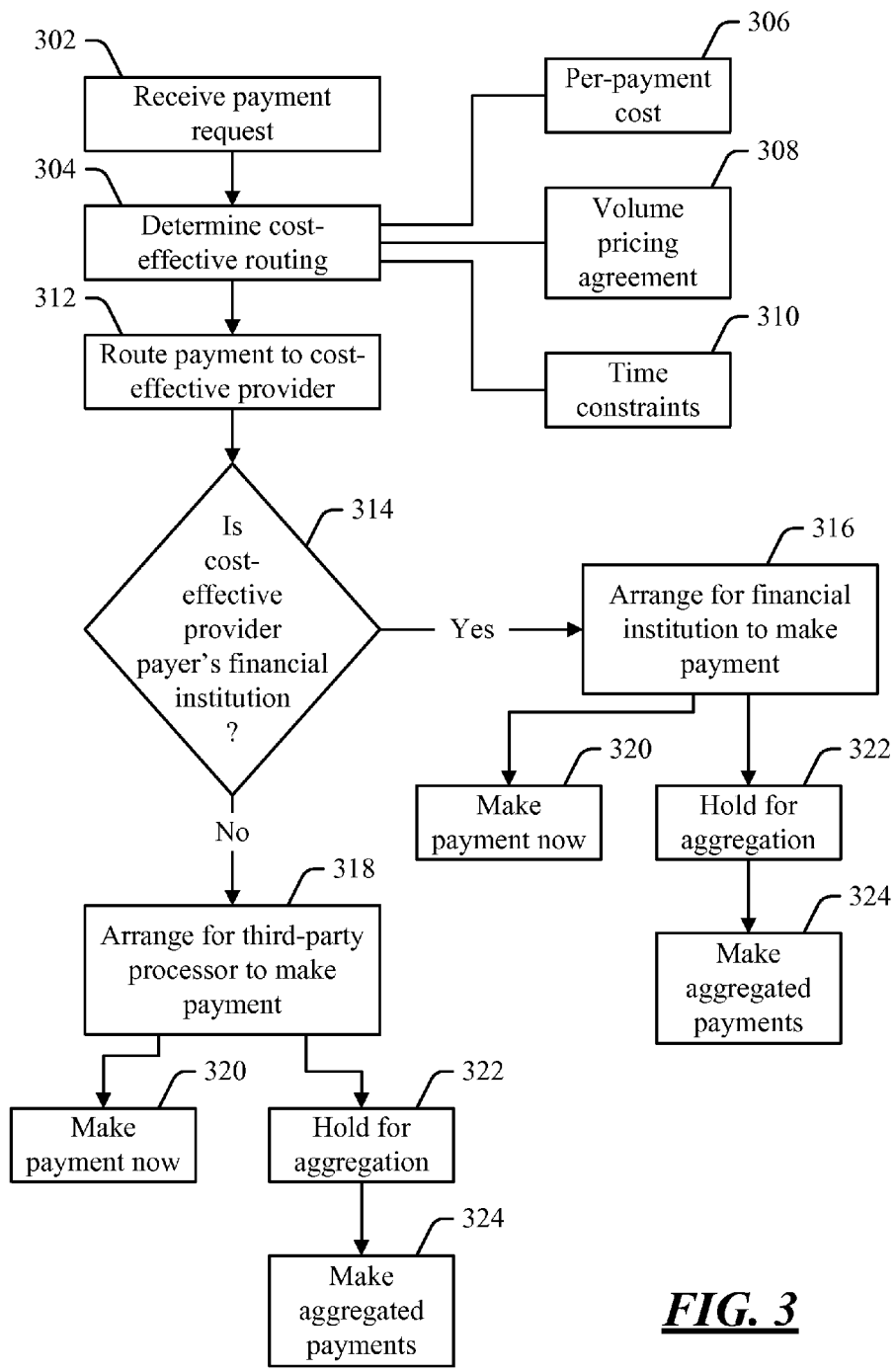
FIG. 3 is a flow diagram of an example process in which a payment may be routed to a cost-effective provider.

FIG. 3 shows, in the form of a flow chart, an example process in which a payment may be routed to a cost-effective provider. Before turning to a description of FIG. 3, it is noted that FIG. 3 is described, by way of example, with reference to components shown in FIGS. 1 and 2, although the process of FIG. 3 may be carried out in any system and is not limited to the scenarios shown in FIGS. 1 and 2. Additionally, the flow diagram of FIG. 3 shows an example in which stages of a process are carried out in a particular order, as indicated by the lines connecting the blocks, but the various stages shown in these diagrams may be performed in any order, or in any combination or sub-combination.

At 302, a payment request is received. For example, financial institution 104 (shown in FIG. 1) may receive a payment request from payer 102 (also shown in FIG. 1).

At 304, a cost-effective routing of the request may be determined. Example considerations that may be taken into account in determining the cost-effective routing include: the per-payment cost of processing a payment (block 306); any volume pricing agreements that may be offered by a provider (block 308); any time constraints on payments (block 310); or any other considerations. Consideration of time constraints (block 310) may allow the process shown in FIG. 3 to determine whether costs can be saved by delaying payments to a later date. For example, it may be cost effective for a particular bank to process a bulk payment to the XYZ credit card issuer once per week. However, some payments may be submitted only a day or two before they are due. Payments that are submitted less than a week before they are due cannot wait a week to be made, but other payments can. If there is money to be saved by holding payments for several days and then submitting those payments en masse, then time constraints on the payments (block 306) may be used to determine whether payments can be held to realize such savings.

At 312, a payment is routed to the cost-effective provider that has been chosen. The particular provider chosen may be the financial institution through which the payer initiated payment, in which case payments may be handled somewhat differently than they would be if they were being routed to a third-party payment processor. Thus, it is determined at 314 whether the chosen payment processor is the financial institution through which the payer initiated payment. If the chosen provider is that financial institution, then the process continues to 316, where the financial institution arranges for payment. For example, the financial institution may make an Electronic Funds Transfer to the payee, or may write the payee a check, in order to effectuate payment. If it is determined at 314 that the chosen payment processor is not the financial institution itself, then the process continues to 318 where arrangements are made to have the chosen payment processor effectuate the payment.

Regardless of whether the payment is being processed by the financial institution or by a third-party processor, the process may proceed differently depending on whether the payment is to be made now, or to be held for some later date. As noted above, some payments that are not immediately due may be held in order to take advantage of various pricing schemes. If the payment is due soon enough that it cannot wait, then payment may be made now (blocks 320). Otherwise, the payment may be held (blocks 322) in order to aggregate it with other like payments (e.g., all payments to the XYZ credit card issuer may be aggregated together). Then, after sufficient time has passed (as indicated by the vertical ellipsis), the aggregated payments may be made (block 324).

Figure 4:
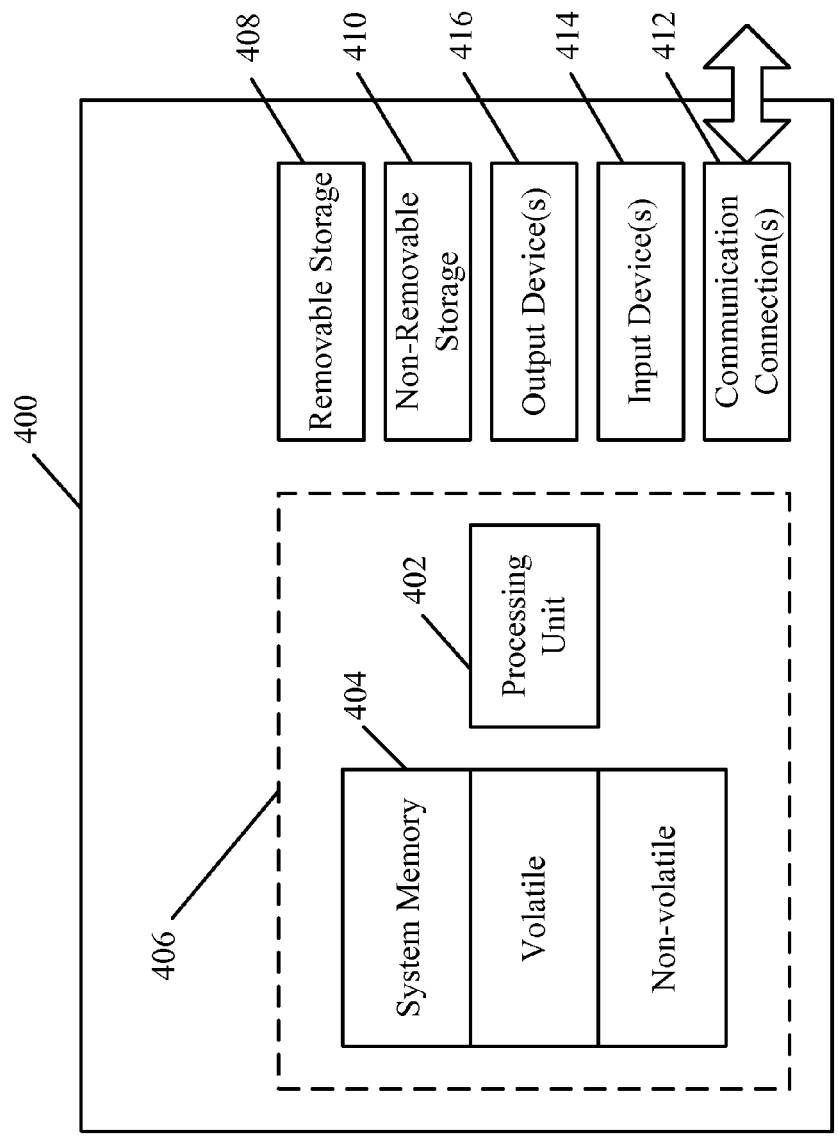
FIG. 4 is a block diagram of an example computing environment that may be used in connection with implementations of the subject matter described herein.

The subject matter described herein may be implemented through the use of a computer system, or other type of device that has some computing mechanism(s). FIG. 4 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions)

embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium comprising computer-readable instructions for routing a payment, the computer-readable instructions comprising instruction that, when executed by a computer:
    receive, from a customer, an indication that said payment is to be made to a payee;
    choose a payment processor that will process said payment and that will make said payment to said payee, said payment processor being chosen based on volume pricing terms and historical record of payments to the payment processor, wherein the chosen payment processor is chosen from a first payment processor and a second payment processor, each of which charges a particular per-payment fee to process a payment to said payee, and wherein the computer-readable instructions further comprise instructions that:
        determine that the chosen payment processor offers a future volume pricing discount for handling a number of payments, wherein the chosen payment processor is the first payment processor with a higher per-payment fee to process the payment to said payee than the second payment processor; and
        determine how close a financial institution that routes the payment to the chosen payment processor is to meeting the number of payments to the payment processor based upon the volume pricing terms and the historical record of the chosen payment processor; and
    route said payment to the chosen payment processor based on the determinations.

2. The computer-readable medium of claim 1, wherein the chosen payment processor being chosen based on which of said first or second payment processors charges the lowest fee to process a payment to said payee.

3. The computer-readable medium of claim 1, wherein said indication is received from said customer at a financial institution, and wherein the computer-readable instructions further comprise instruction that:
    determine to have the payment made by said financial institution, wherein said financial institution acts as said payment processor.

4. The computer-readable medium of claim 1, further comprising instruction that:
    hold said payment to be made on a future date along with other payments to said payee.

5. The computer-readable medium of claim 1, further comprising instruction that:
    take into account a time constraint on said payment in determining whether to hold said payment for a later date to be aggregated with other payments to said payee.

6. The computer-readable medium of claim 1, wherein said indication is received from said customer by a financial institution, wherein said financial institution has relationships with the first and second payment processors, and wherein the computer-readable instructions further comprise instruction that:
    consult a database to determine pricing structures associated with each of said first and second payment providers, wherein the chosen payment provider is chosen from among said first and second payment providers based on said pricing structures.

7. A computer-readable medium comprising computer-readable instructions for processing a payment, the computer-readable instructions comprising instructions that, when executed by a computer:
    receive, from a customer and at a financial institution, a request to make a payment to a payee, said request being received by said financial institution with which said customer has an account, said financial institution having an arrangement with a payment processor;
    determine to use the financial institution to process said payment based a comparison of (a) a per-payment fee charged by said payment processor and (b) an amount that it costs for said financial institution to process said payment without using said payment processor, and wherein the computer-readable instructions further comprise instructions that:
        determine that said payment processor offers a future volume pricing discount for handling a certain number of payments, wherein the financial institution has a higher per-payment cost to process the payment to said payee than the future volume pricing discount per-payment fee of the payment processor;
        determine how close the financial institution will is to meeting the certain number of payments based on reviewing volume pricing terms and a historical record of payments to the payment processor; and
        make said payment directly from said financial institution to said payee without using said payment processor based on the determinations.

8. The computer-readable medium of claim 7, further comprising instructions that:
    aggregate payments from a plurality of customers to said payee; and make an aggregate payment to said payee to effectuate said payments.

9. The computer-readable medium of claim 7, wherein said request indicates a date on which said payment is to be made, and wherein the computer-readable instructions further comprises instructions that:
hold said payment later than said date to allow said payment to be aggregated with other payments to said payee.

10. The computer-readable medium of claim 9, further comprising instructions that:
determine that holding said payment does not violate a time constraint that applies to said payment.

11. The computer-readable medium of claim 7, further comprising instructions that:
determine not to use said payment processor based on a pricing structure associated with said payment processor.

12. The computer-readable medium of claim 7, further comprising instructions that:
determine that non-use of said payment processor to process said payment will not affect said financial institution's ability to obtain volume pricing with said payment processor.

13. A system for routing a payment, the system comprising:
processor resources; and
memory resources coupled to the processor resources and configured to direct the processor resources to:
enter into an arrangement with a payment processor to process payments on behalf of a financial institution, said arrangement comprising a volume pricing structure in which said financial institution receives a lower per-payment price for a future payment when said payment processor processes a minimum number of payments for said financial institution than said financial institution would pay if said payment processor processed fewer than said minimum number of payments;
receive, from a customer and at said financial institution, a request to make a payment to a payee;
determine how close the financial institution is to meeting the minimum number of payments for the future volume pricing discount for the payment processor based on volume pricing terms and a historical record of payments to the payment processor; and
make payment to said payee directly by said financial institution without use of said payment processor based on the determinations.

14. The system of claim 13, wherein the memory resources are further configured to direct the processor resources to:
store said pricing structure in a database.

15. The system of claim 14, wherein the memory resources are further configured to direct the processor resources to:
retrieve said pricing structure from said database when determining that non-use of said payment processor to process said payment will not prevent said financial institution from paying said lower price.

16. The system of claim 13, wherein said request indicates a date on which said payment is to be made, and wherein the memory resources are further configured to direct the processor resources to:
hold said payment past said date; and
aggregate said payment with other payments that are to be made to the same payee.

17. The system of claim 16, wherein the memory resources are further configured to direct the processor resources to:
determine that holding said payment past said date will not violate a time constraint on said payment.

18. The system of claim 13, wherein the memory resources are further configured to direct the processor resources to:
make said payment by check.

19. The system of claim 13, wherein the memory resources are further configured to direct the processor resources to:
make said payment by electronic funds transfer.

\* \* \* \* \*